US010419712B2

(12) United States Patent
Arrasvuori et al.

(10) Patent No.: US 10,419,712 B2
(45) Date of Patent: Sep. 17, 2019

(54) FLEXIBLE SPATIAL AUDIO CAPTURE APPARATUS

(71) Applicant: Nokia Technologies Oy, Espoo (FI)

(72) Inventors: Juha Henrik Arrasvuori, Tampere (FI); Kari Juhani Jarvinen, Tampere (FI); Roope Olavi Jarvinen, Lempaala (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/048,789

(22) Filed: Jul. 30, 2018

(65) Prior Publication Data

US 2018/0338106 A1    Nov. 22, 2018

Related U.S. Application Data

(63) Continuation of application No. 14/386,333, filed as application No. PCT/IB2012/051699 on Apr. 5, 2012.

(51) Int. Cl.
*G06F 1/16* (2006.01)
*H04M 1/02* (2006.01)
(Continued)

(52) U.S. Cl.
CPC .......... *H04N 5/607* (2013.01); *G06F 1/1684* (2013.01); *H04M 1/0206* (2013.01);
(Continued)

(58) Field of Classification Search
CPC ... H04N 5/607; H04N 5/23238; H04M 1/035; H04M 1/02; H04M 1/0206;
(Continued)

(56) References Cited

U.S. PATENT DOCUMENTS

| 5,661,808 A | 8/1997 | Klayman |
| 5,715,318 A | 2/1998 | Hill et al. |

(Continued)

FOREIGN PATENT DOCUMENTS

| CN | 101981943 A | 2/2011 |
| EP | 1752880 A1 | 2/2007 |

(Continued)

OTHER PUBLICATIONS

Pulkki, "Spatial Sound Reproduction With Directional Audio Coding", Journal of the Audio Engineering Society, vol. 55, No. 6, Jun. 2007, pp. 503-516.

(Continued)

*Primary Examiner* — Yogeshkumar Patel

(74) *Attorney, Agent, or Firm* — Harrington & Smith

(57) ABSTRACT

An apparatus comprising: at least one determiner configured to determine at least one characteristic associated with a flexible part of a further apparatus; a signal processor configured to process at least one signal dependent on the at least one characteristic associated with the flexible part of the further apparatus, wherein the signal is at least one of an audio and a video signal; and an user interface generator configured to generate at least one user interface indication dependent on the characteristic associated with a flexible part of the further apparatus.

20 Claims, 12 Drawing Sheets

(51) Int. Cl.
*H04M 1/03* (2006.01)
*H04N 5/60* (2006.01)
*H04R 1/40* (2006.01)
*H04R 3/00* (2006.01)
*H04S 7/00* (2006.01)
*H04R 29/00* (2006.01)

(52) U.S. Cl.
CPC ............ *H04M 1/035* (2013.01); *H04R 3/005* (2013.01); *H04R 29/005* (2013.01); *H04S 7/30* (2013.01); *H04R 1/406* (2013.01); *H04R 2201/405* (2013.01); *H04R 2430/20* (2013.01); *H04R 2460/07* (2013.01); *H04R 2499/11* (2013.01); *H04S 2420/01* (2013.01)

(58) Field of Classification Search
CPC ... H04M 1/0268; H04R 3/005; H04R 29/005; H04R 1/406; H04R 2430/20; H04R 2430/21; H04R 2430/25; H04R 2460/07; H04R 2499/11; H04R 2201/403; H04R 2201/405; H04R 2201/023; H04R 2201/003; H04S 2420/01; H04S 7/303; H04S 7/30; G06F 1/1684
See application file for complete search history.

(56) References Cited

U.S. PATENT DOCUMENTS

| | | |
|---|---|---|
| 7,706,543 B2 | 4/2010 | Daniel |
| 8,023,660 B2 | 9/2011 | Faller |
| 8,280,077 B2 | 10/2012 | Avendano et al. |
| 8,335,321 B2 | 12/2012 | Daishin et al. |
| RE44,611 E | 11/2013 | Metcalf |
| 8,600,530 B2 | 12/2013 | Nagle et al. |
| 2002/0196294 A1 | 12/2002 | Sesek |
| 2003/0161479 A1 | 8/2003 | Yang et al. |
| 2004/0228498 A1 | 11/2004 | Sekine |
| 2005/0195990 A1 | 9/2005 | Kondo et al. |
| 2005/0244023 A1 | 11/2005 | Roeck et al. |
| 2006/0279418 A1 | 12/2006 | Albert et al. |
| 2008/0013751 A1 | 1/2008 | Hiselius |
| 2008/0232601 A1 | 9/2008 | Pulkki |
| 2008/0259731 A1 | 10/2008 | Happonen |
| 2009/0012779 A1 | 1/2009 | Ikeda et al. |
| 2009/0022328 A1 | 1/2009 | Neugebauer et al. |
| 2009/0027566 A1 | 1/2009 | Wargon |
| 2009/0088964 A1 | 4/2009 | Schaaf et al. |
| 2010/0056223 A1 | 3/2010 | Choi et al. |
| 2010/0061558 A1 | 3/2010 | Faller |
| 2010/0123785 A1 | 5/2010 | Chen et al. |
| 2010/0150364 A1 | 6/2010 | Buck et al. |
| 2010/0166191 A1 | 7/2010 | Herre et al. |
| 2010/0185308 A1 | 7/2010 | Yoshida et al. |
| 2010/0215199 A1 | 8/2010 | Breebaart |
| 2010/0284551 A1 | 11/2010 | Oh et al. |
| 2010/0290629 A1 | 11/2010 | Morii |
| 2010/0317409 A1* | 12/2010 | Jiang ............... G06F 1/1626 455/566 |
| 2011/0013075 A1 | 1/2011 | Kim et al. |
| 2011/0019836 A1 | 1/2011 | Ishibashi et al. |
| 2011/0038485 A1 | 2/2011 | Neoran |
| 2011/0054890 A1 | 3/2011 | Ketola et al. |
| 2011/0109538 A1 | 5/2011 | Kerr et al. |
| 2011/0268292 A1 | 11/2011 | Suvanto et al. |
| 2011/0275434 A1 | 11/2011 | Cheng et al. |
| 2011/0299702 A1 | 12/2011 | Faller |
| 2012/0013768 A1 | 1/2012 | Zurek et al. |
| 2012/0019689 A1 | 1/2012 | Zurek et al. |
| 2012/0128174 A1 | 5/2012 | Tammi et al. |
| 2012/0284619 A1* | 11/2012 | Myllyla ............... H04R 29/008 715/716 |
| 2013/0044884 A1 | 2/2013 | Tammi et al. |
| 2013/0222270 A1* | 8/2013 | Winkler ............... H04M 1/0233 345/173 |

FOREIGN PATENT DOCUMENTS

| | | |
|---|---|---|
| EP | 2154910 A1 | 2/2010 |
| EP | 2251857 A1 | 11/2010 |
| GB | 394325 A | 6/1933 |
| GB | 2491366 A | 12/2012 |
| JP | 2005-099418 A | 4/2005 |
| JP | 2006-180039 A | 7/2006 |
| JP | 2009-271183 A | 11/2009 |
| JP | 2011-165056 A | 8/2011 |
| JP | 2011-180470 A | 9/2011 |
| WO | 2000/034942 A1 | 6/2000 |
| WO | 2005/086139 A1 | 9/2005 |
| WO | 2007/011157 A1 | 1/2007 |
| WO | 2008/046531 A1 | 4/2008 |
| WO | 2009/109217 A1 | 9/2009 |
| WO | 2009/150288 A1 | 12/2009 |
| WO | 2010/017833 A1 | 2/2010 |
| WO | 2010/028784 A1 | 3/2010 |
| WO | 2010/052365 A1 | 5/2010 |
| WO | 2010/112677 A1 | 10/2010 |
| WO | 2010/125228 A1 | 11/2010 |
| WO | 2011/063857 A1 | 6/2011 |
| WO | 2011/076286 A1 | 6/2011 |
| WO | WO-2011076286 A1 * | 6/2011 ........... H04R 29/008 |
| WO | 2012/061149 A1 | 5/2012 |
| WO | 2013/072554 A1 | 5/2013 |
| WO | 2013/079781 A1 | 6/2013 |

OTHER PUBLICATIONS

Laitinen, "Binaural Reproduction for Directional Audio Coding", IEEE Workshop on Applications of Signal Processing to Audio and Acoustics, Oct. 18-21, 2009, pp. 337-340.

Vilkamo et al., "Directional Audio Coding: Virtual Microphone-Based Synthesis and Subjective Evaluation", Journal of the Audio Engineering Society, vol. 57, Issue 9, Sep. 2009, pp. 709-724.

Gerzon, "Ambisonics in Multichannel Broadcasting and Video", Journal of the Audio Engineering Society, vol. 33, Issue 11, Oct. 8-12, 1983, 30 pages.

Tamai et al., "Real-Time 2 Dimensional Sound Source Localization by 128-Channel Huge Microphone Array", 13th IEEE International Workshop on Robot and Human Interactive Communication, Sep. 20-22, 2004, pp. 65-70.

Nakadai et al., "Sound Source Tracking With Directivity Pattern Estimation Using a 64 Channel Microphone Array", IEEE/RSJ International Conference on Intelligent Robots and Systems, Aug. 2-6, 2005, pp. 1690-1696.

Backman, "Microphone Array Beam Forming for Multichannel Recording", Presented at 114th AES Convention, Convention Paper 5721, Mar. 22-25, 2003, 7 pages.

Merimaa, "Applications of a 3-D Microphone Array", Audio Engineering Society, Presented at the 112th Convention, Convention Paper 5501, May 10-13, 2002, pp. 1-11.

Meyer et al., "Spherical Microphone Array for Spatial Sound Recording", Presented at the 115th AES Convention, Convention Paper 5975, Oct. 10-13, 2003, pp. 1-9.

Kallinger et al., "Enhanced Direction Estimation Using Microphone Arrays for Directional Audio Coding", IEEE Hands-Free Speech Communication and Microphone Arrays, May 6-8, 2008, pp. 45-48.

Ahonen et al., "Directional Analysis of Sound Field with Linear Microphone Array and Applications in Sound Reproduction", Presented at the 124th AES Convention, Convention Paper 7329, May 17-20, 2008, pp. 1-11.

Wiggins, "An Investigation Into the Real-Time Manipulation and Control of Three dimensional Sound Fields", PhD thesis, 2004, 370 pages.

Gallo et al., "Extracting and Re-Rendering Structured Auditory Scenes From Field Recordings", 30th AES International Conference on Intelligent Audio Environments, Mar. 15-17, 2007, pp. 1-11.

Goodwin et al., "Binaural 3-D Audio Rendering Based on Spatial Audio Scene Coding", Presented at the 123rd AES Convention, Convention Paper 7277, Oct. 5-8, 2007, pp. 1-12.

(56) References Cited

OTHER PUBLICATIONS

Baumgarte et al., "Binaural Cue Coding—Part I: Psychoacoustic Fundamentals and Design Principles", IEEE Transactions on Speech and Audio Processing, vol. 11, Issue: 6, Nov. 2003, pp. 509-519.
Faller et al., "Binaural Cue Coding—Part II: Schemes and Applications", IEEE Transactions on Speech and Audio Processing, vol. 11, Issue: 6, Nov. 2003, pp. 520-531.
Lindblom et al., "Flexible Sum-Difference Stereo Coding Based on Time-Aligned Signal Components", IEEE Workshop on Applications of Signal Processing to Audio and Acoustics, Oct. 16-19, 2005, pp. 255-258.
Pulkki, "Virtual Sound Source Positioning Using Vector Base Amplitude Panning", Journal of the Audio Engineering Society, vol. 45, Issue 6, Jun. 1997, pp. 456-466.
Herre et al., "MPEG Surround—The ISO/MPEG Standard for Efficient and Compatible Multichannel Audio Coding", Journal of Audio Engineering Society, 122nd Convention, vol. 56, No. 11, Nov. 2008, pp. 932-955.
"Information Technology—MPEG Audio Technologies—Part 1: MPEG Surround", ISO/IEC 23003-1, Feb. 15, 2007, 280 pages.
Fielder et al., "Introduction to Dolby Digital Plus, An Enhancement to the Dolby Digital Coding System", Presented at the 117th Convention, Convention Paper 6196, Oct. 28-31, 2004, pp. 1-30.
Kassier et al., "An Informal Comparison Between Surround-Sound Microphone Techniques", Presented at the 118th Convention, Convention Paper 6429, May 28-31, 2005, pp. 1-17.
Heikkanen et al., "Reproduction of Virtual Reality with Multichannel Microphone Techniques", Presented at the 122nd Convention, Convention Paper 7070, May 5-8, 2007, 7 pages.
Craven, "Continuous Surround Panning for 5-Speaker Reproduction", Audio Engineering Society, AES 24th international Conferences on Multichannel Audio, Paper No. 9, Jun. 2003.
"Soundstream—Sound Activated Screen Saver Mac Osx", Video Dailymotion, Retrieved on Dec. 18, 2014, Webpage available at : http://www.dailymotion.com/video/x9lb7e_soundstream-sound-activated-screen_tech.
"The Psychedelic Screen Saver", Synthesoft, Retrieved on Aug. 2, 2011, Webpage available at : http://www.synthesoft.com/psych/psych.htm.
"iPod to Create its Own Screen Saver Based on the Surrounding", The Mobile Indian, Retrieved on Dec. 18, 2014, Webpage available at : http://www.themobileindian.com/news/1169_iPod-to-create-its-own-screen-saver-based-on-the-surrounding.
Blumlein, "British Patent Specification 394,325", Journal of the Audio Engineering Society, vol. 6, Issue 2, Apr. 1958, pp. 32-40.
Dmochowski et al., "A Generalized Steered Response Power Method for Computationally Viable Source Localization", IEEE Transactions on Audio, Speech, and Language Processing, vol. 15, Issue: 8, Nov. 2007, pp. 2510-2526.
Godara, "Limitations and Capabilities of Directions-of-Arrival Estimation Techniques using an Array of Antennas: A Mobile Communications Perspective", IEEE International Symposium on Phased Array Systems and Technology, Oct. 15-18, 1996, pp. 327-333.
U.S. Appl. No. 14/365,597, "A Method, An Apparatus and A Computer Program for Determination of an Audio Track", filed Jun. 13, 2014, 33 pages.
Aoki et al., "Sound source segregation based on estimating incident angle of each frequency component of input signals acquired by multiple monophones", Acoustical Science and Technology, vol. 22, No. 2, 2001, pp. 149-157.
Knapp et al., "The Generalized Correlation Method for Estimation of Time Delay", IEEE Transactions on Acoustics, Speech and Signal Processing, vol. 24, Issue: 4, Aug. 1976, pp. 320-327.
Roman, et al., "Speech Segregation based on Sound Localization", Journal of Acoustics Socienty of America, Oct. 2003, vol. 114, No. 4, pp. 2236-2252.
Irwan et al., "A Method to Convert Stereo to Multi-Channel Sound", Presented at the 19th international Conference, Paper No. 1895, Jun. 21-24, 2001.
Breebaart et al., "Multi-Channel Goes Mobile, MPEG Surround Binaural Rendering", 29th International Conference Audio for Mobile and Handheld Devices, Sep. 2-4, 2006, pp. 1-13.
"Soundstream: Sound-Responsive Mac Screen Saver", Soundstream, Retrieved on Jan. 2, 2015, Webpage available at : http://pcheese.net/software/soundstream/.
Tellakula. "Acoustic Source Localization Using Time Delay Estimation", Thesis, Aug. 2007, 82 pages.
Arrasvuori et al., "Designing Interactive Music Mixing Applications for Mobile Devices", Proceedings of the 2nd international conference on Digital interactive media in entertainment and arts, 2007, pp. 20-27.
U.S. Appl. No. 13/209,738, "Apparatus and Method for Multi-Channel Signal Playback", filed Aug. 15, 2001, 32 pages.
Hassanpur et al., "Adaptive DOA Tracking Using Microphone Arrays", 9th International Symposium on Signal Processing and Its Applications, Feb. 12-15, 2007, 4 pages.
U.S. Appl. No. 12/927,663, "Converting Multi-Microphone Captured Signals to Shifted Signals Useful for Binaural Signal Processing and Use Thereof" filed Nov. 19, 2010, 22 pages.
Pulkki et al., "Directional Audio Coding-Perception-Based Reproduction of Spatial Sound", International Workshop on the Prnciples and Applications of Spatial Hearing, Nov. 11-13, 2009, 4 pages.

\* cited by examiner

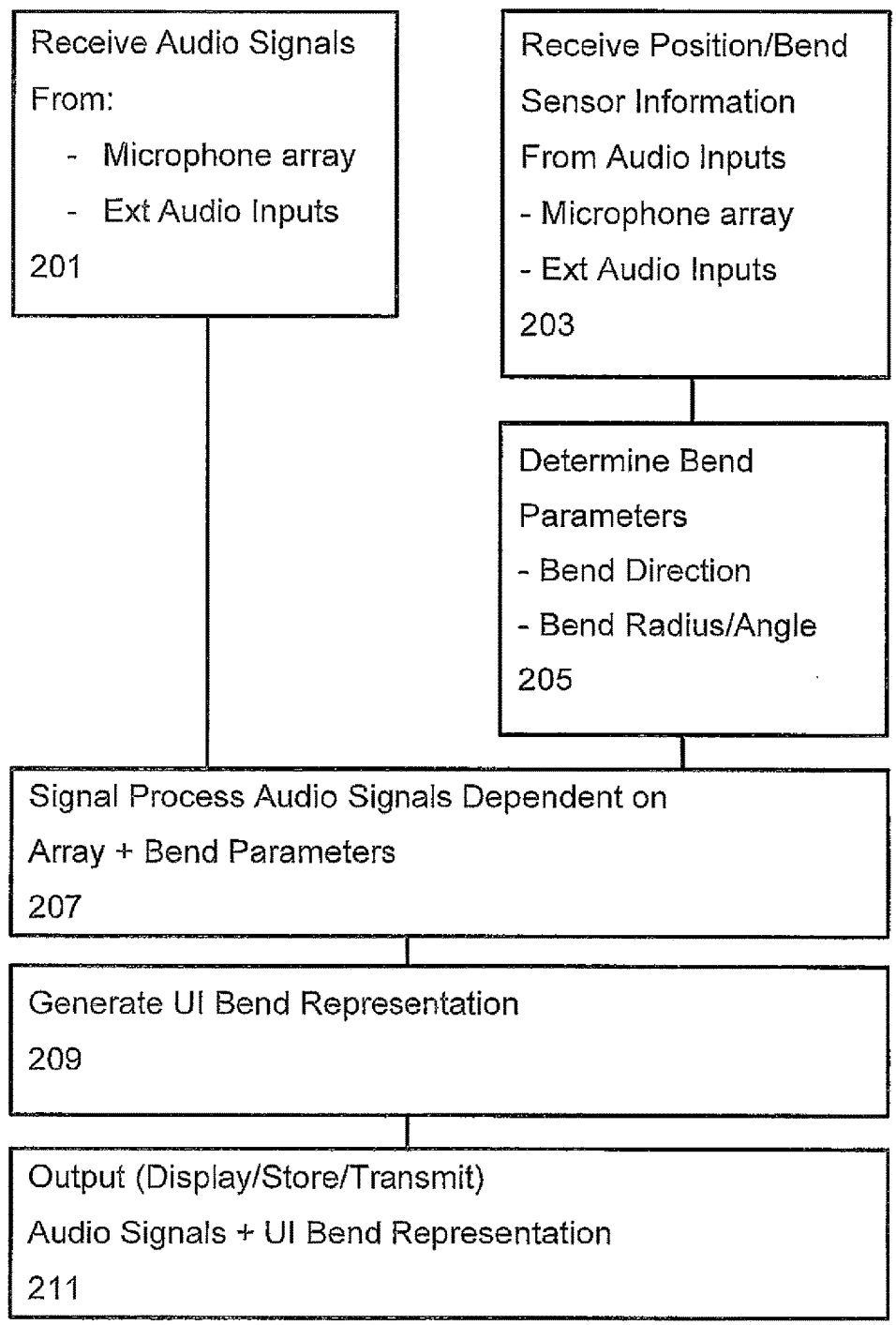

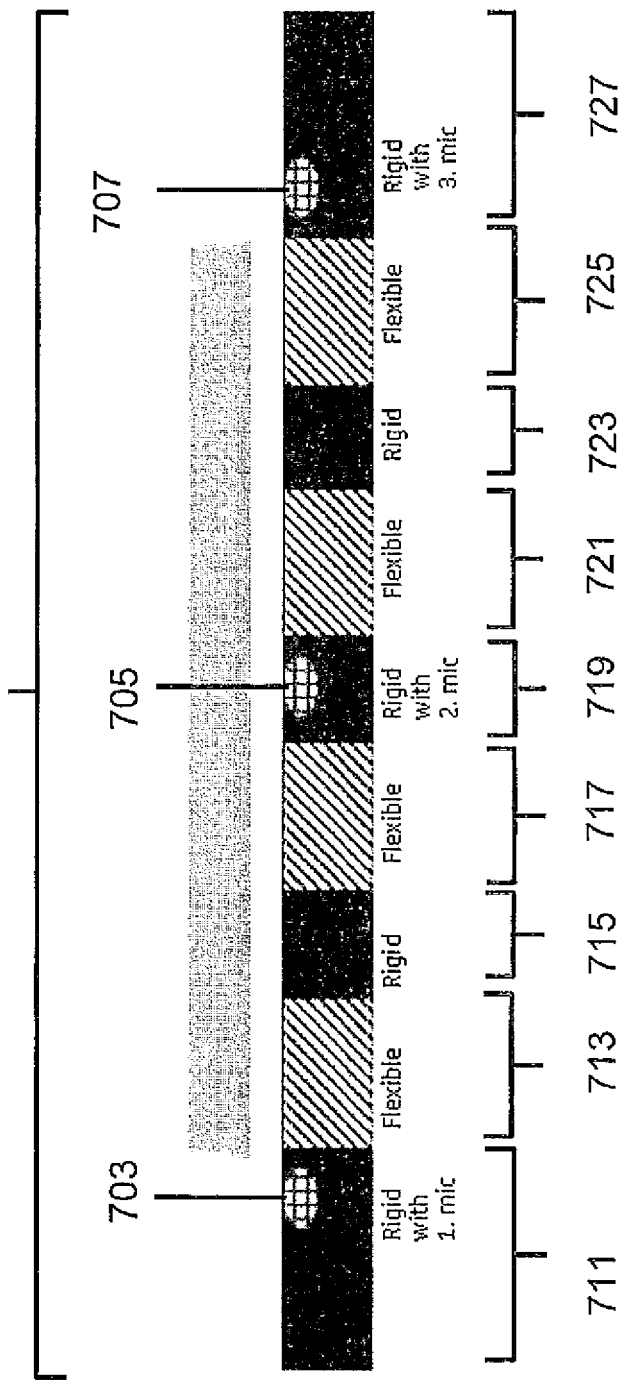

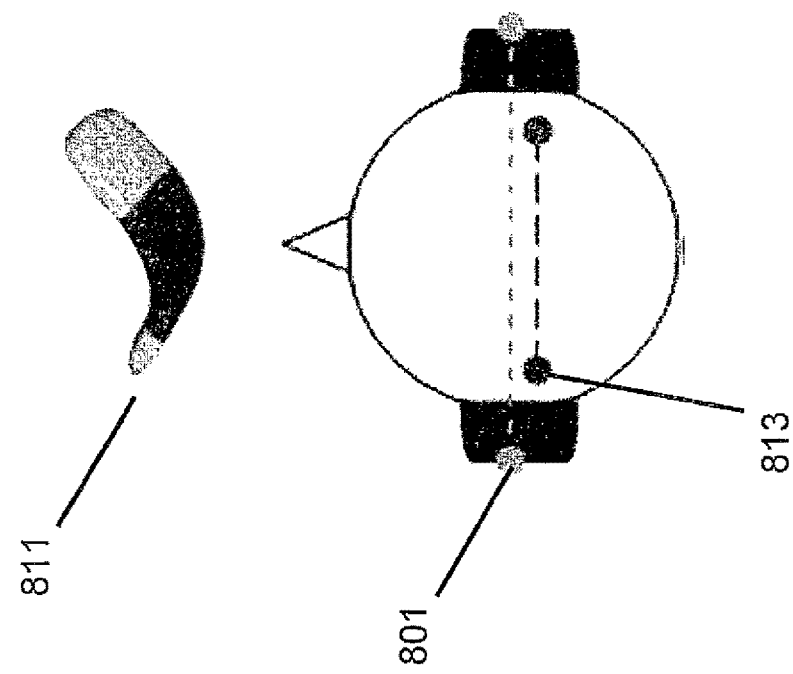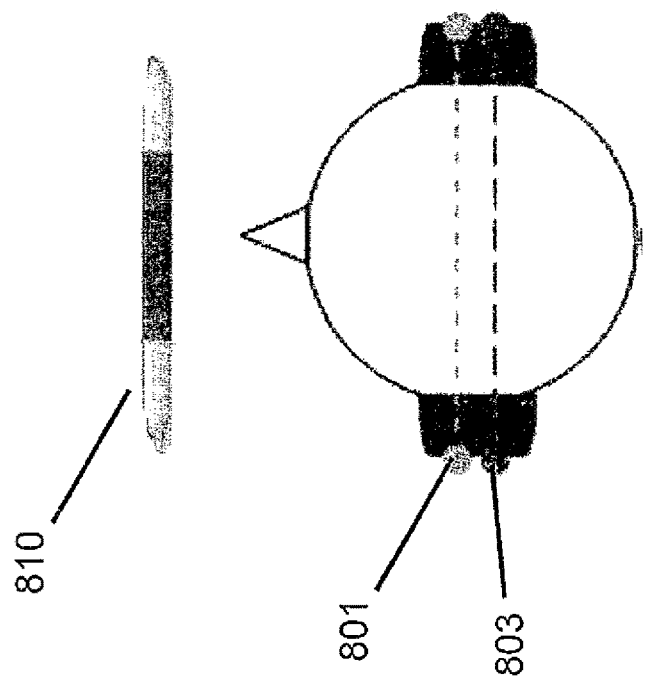

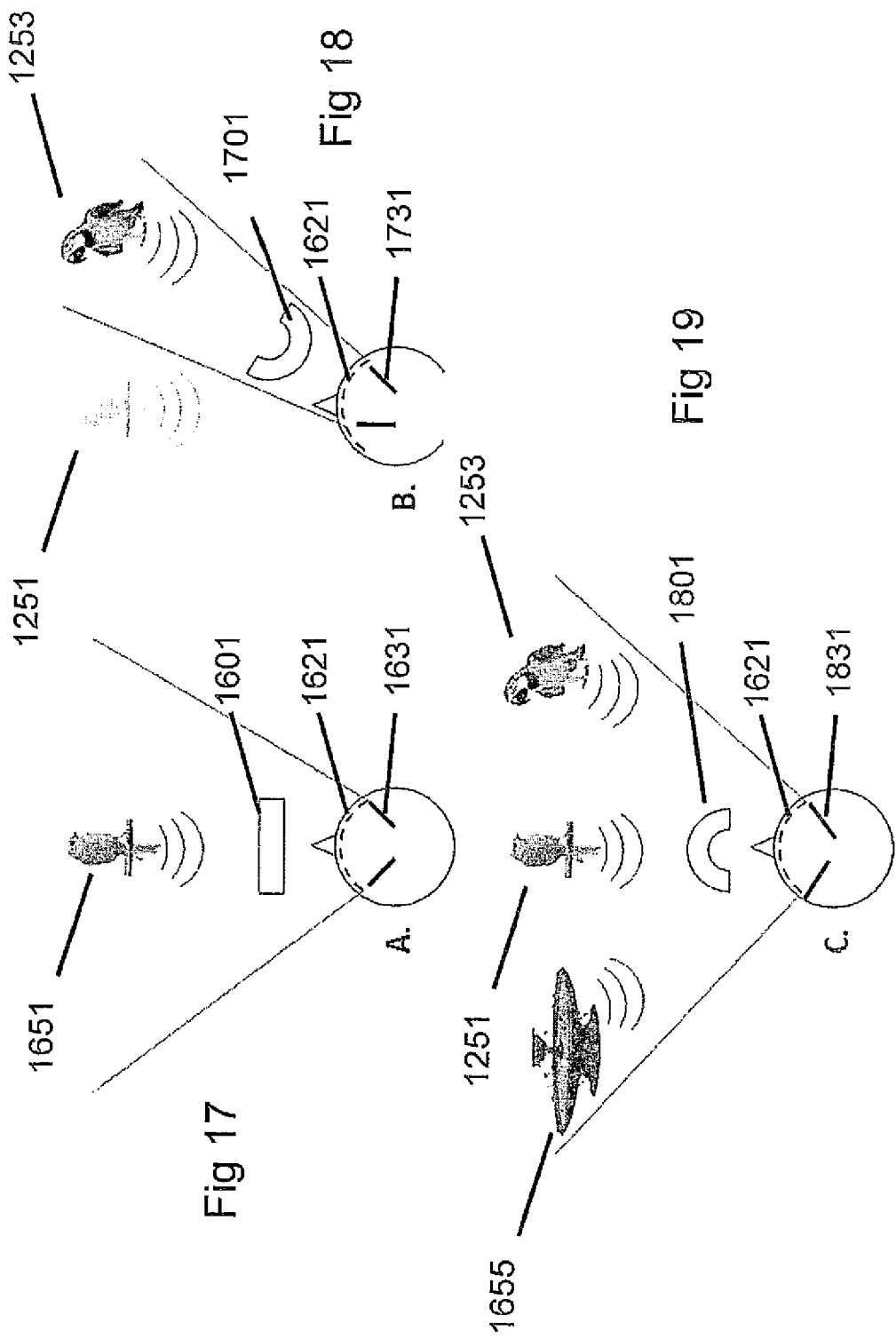

FLEXIBLE SPATIAL AUDIO CAPTURE APPARATUS

CROSS REFERNCE TO RELATED APPLICATIONS

This application is a continuation of U.S. application Ser. No. 14/386,333, filed on Jan. 21, 2015, which was originally filed as PCT Application No. PCT/IB2012/051699 filed on Apr. 5, 2012, the disclosures of which are incorporated by reference in their entireties.

FIELD

The present application relates to flexible spatial audio capture apparatus, and in particular, but not exclusively to flexible spatial audio capture portable apparatus.

BACKGROUND

Spatial audio capture has become increasingly common as mass produced handheld devices are equipped with more than one microphone, typically arranged in a microphone array configuration. The handheld devices equipped with microphones can generate more than one audio signal from the environment using the microphone array. Depending on the configuration and positions of the microphones and the type of microphones the generated audio signals can be digitally to signal processed so to generate a better audio signal for the user of the device. The current apparatus microphones arrays are typically arranged in a fixed configuration with defined angles and distances between the microphones and sometimes with microphones with defined orientations. The signal processor then receives the microphone array audio signals and using the fixed position information can process these signals to narrow or broaden the width of the audio field observed by controlling the panning of the audio signals using the signal processor.

SUMMARY

Embodiments attempt to address the above problem.

There is provided according to a first aspect a method comprising: determining at least one characteristic associated with a flexible part of an apparatus; processing at least one signal dependent on the at least one characteristic associated with the flexible part of the apparatus, wherein the signal is at least one of an audio and a video signal; and generating at least one user interface indication dependent on the characteristic associated with a flexible part of an apparatus.

The at least one characteristic may comprise at least one of: a bend angle for the flexible part of the apparatus; a bend radius for the flexible part of the apparatus; a bend direction for the flexible part of the apparatus; a position for the flexible part of the apparatus relative to a further apparatus; and a direction for the flexible part of the apparatus relative to a further apparatus.

The at least one signal may comprise at least one of: at least one microphone audio signal; at least one audio signal received from a separate apparatus; at least one audio signal in a separate apparatus; at least one camera video signal; at least one video signal received from a separate apparatus; and at least one video signal in a separate apparatus.

Processing at least one audio signal dependent on the at least one characteristic associated with the flexible part of the apparatus may comprise defining an audio capture field for the at least one audio signal dependent on the at least one characteristic.

The at least one characteristic may be a bend direction, and defining an audio capture field for the at least one audio signal dependent on the at least one characteristic may comprise: a normal audio capture field where the bend direction is flat; a narrowed audio capture field where the bend direction is inwards; and a broadened audio capture field where the bend direction is outwards.

Processing at least one audio signal dependent on the at least one characteristic associated with the flexible part of the apparatus may comprise compressing the at least one audio signal dependent on the at least one bend parameter indicating an inwards bend direction.

Processing the at least one audio signal dependent on the at least one characteristic associated with the flexible part of the apparatus may comprise generating an audio signal with an audio capture field dependent on the at least one characteristic.

Processing the at least one audio signal dependent on the at least one characteristic associated with the flexible part of the apparatus may comprise generating an audio signal with an audio capture field dependent on the at least one directional parameter.

Generating at least one user interface indication dependent on the at least one characteristic associated with the flexible part of the apparatus may comprise at least one of: an audible indication; and a visual indication.

The audible indication dependent on the at least one characteristic associated with the flexible part of the apparatus may comprise: at least one first audio signal defining a normal audio capture field; and at least one second audio signal defining an audio capture field dependent on the at least one characteristic associated with the flexible part of the apparatus.

The at least one first and the at least one second audio signal may be spatially located audio signals.

The visual indication may comprise at least one of: a visual representation of the normal audio capture field; a visual representation of the audio capture field dependent on the at least one characteristic associated with the flexible part of the apparatus; an augmented reality representation of the audio capture field dependent on the at least one characteristic associated with the flexible part of the apparatus; an indication of the estimated audio capture field; an indication representing a bend angle determined to produce an audio capture field to capture at least one audio source; an indication of the number of audio sources within an audio capture field defined by the at least one characteristic associated with the flexible part of the apparatus; and an indication of the total number of audio sources within a full audio capture field.

Determining at least one characteristic associated with a flexible part of the apparatus may comprise at least one of: sensing the characteristic associated with a flexible part of the apparatus; and receiving at a further apparatus the characteristic associated with a flexible part of the apparatus.

According to a second aspect there is provided an apparatus comprising: means for determining at least one characteristic associated with a flexible part of a further apparatus; means for processing at least one signal dependent on the at least one characteristic associated with the flexible part of the further apparatus, wherein the signal is at least one of an audio and a video signal; and means for generating at least one user interface indication dependent on the characteristic associated with a flexible part of the further apparatus.

The at least one characteristic may comprise at least one of: a bend angle for the flexible part of the further apparatus; a bend radius for the flexible part of the further apparatus; a bend direction for the flexible part of the further apparatus; a position for the flexible part of the further apparatus relative to the apparatus; and a direction for the flexible part of the further apparatus relative to a the apparatus.

The at least one signal may comprise at least one of: at least one microphone audio signal; at least one audio signal received from a separate apparatus; at least one audio signal in the apparatus; at least one camera video signal; at least one video signal received from a separate apparatus; and at least one video signal in the apparatus.

The means for processing at least one audio signal dependent on the at least one characteristic associated with the flexible part of the further apparatus may comprise means for defining an audio capture field for the at least one audio signal dependent on the at least one characteristic.

The at least one characteristic may be a bend direction, and the means for defining an audio capture field for the at least one audio signal dependent on the at least one characteristic may be configured to define: a normal audio capture field where the bend direction is flat; a narrowed audio capture field where the bend direction is inwards; and a broadened audio capture field where the bend direction is outwards.

The means for processing at least one audio signal dependent on the at least one characteristic may comprise means for compressing the at least one audio signal dependent on the at least one bend parameter indicating an inwards bend direction.

The means for processing the at least one audio signal dependent on the at least one characteristic may comprise means for generating an audio signal with an audio capture field dependent on the at least one characteristic.

The means for processing the at least one audio signal dependent on the at least one characteristic may comprise means for generating an audio signal with an audio capture field dependent on at least one directional parameter.

The means for generating at least one user interface indication dependent on the at least one characteristic may comprise at least one of: means for generating an audible indication; and means for generating a visual indication.

The means for generating the audible indication may comprise: means for generating at least one first audio signal defining a normal audio capture field; and means for generating at least one second audio signal defining an audio capture field dependent on the at least one characteristic.

The at least one first and the at least one second audio signals may be spatially located audio signals.

The means for generating the visual indication may comprise at least one of: means for generating a visual representation of the normal audio capture field; means for generating a visual representation of the audio capture field dependent on the at least one characteristic; means for generating an augmented reality representation of the audio capture field dependent on the at least one characteristic; means for generating an indication of the estimated audio capture field; means for generating an indication representing a bend angle determined to produce an audio capture field to capture at least one audio source; means for generating an indication of the number of audio sources within an audio capture field defined by the at least one characteristic; and means for generating an indication of the total number of audio sources within a full audio capture field.

The means for determining at least one characteristic may comprise at least one of: means for sensing the characteristic; and means for receiving at the apparatus the characteristic associated with a flexible part of the further apparatus.

An apparatus may comprise: the apparatus as described herein, and the further apparatus comprising at least one flexible part.

According to a third aspect there is provided an apparatus comprising at least one processor and at least one memory including computer code for one or more programs, the at least one memory and the computer code configured to with the at least one processor cause the apparatus to at least perform: determining at least one characteristic associated with a flexible part of a further apparatus; processing at least one signal dependent on the at least one characteristic associated with the flexible part of the further apparatus, wherein the signal is at least one of an audio and a video signal; and generating at least one user interface indication dependent on the characteristic associated with a flexible part of the further apparatus.

The at least one characteristic may comprise at least one of: a bend angle for the flexible part of the further apparatus; a bend radius for the flexible part of the further apparatus; a bend direction for the flexible part of the further apparatus; a position for the flexible part of the further apparatus relative to the apparatus; and a direction for the flexible part of the further apparatus relative to a the apparatus.

The at least one signal may comprise at least one of: at least one microphone audio signal; at least one audio signal received from a separate apparatus; at least one audio signal in the apparatus; at least one camera video signal; at least one video signal received from a separate apparatus; and at least one video signal in the apparatus.

The processing at least one audio signal dependent on the at least one characteristic associated with the flexible part of the further apparatus may cause the apparatus to perform defining an audio capture field for the at least one audio signal dependent on the at least one characteristic.

The at least one characteristic may be a bend direction, and the defining an audio capture field for the at least one audio signal dependent on the at least one characteristic may cause the apparatus to perform defining: a normal audio capture field where the bend direction is flat; a narrowed audio capture field where the bend direction is inwards; and a broadened audio capture field where the bend direction is outwards.

The processing at least one audio signal dependent on the at least one characteristic may cause the apparatus to perform compressing the at least one audio signal dependent on the at least one bend parameter indicating an inwards bend direction.

The processing the at least one audio signal dependent on the at least one characteristic may cause the apparatus to perform generating an audio signal with an audio capture field dependent on the at least one characteristic.

The processing the at least one audio signal dependent on the at least one characteristic may cause the apparatus to perform generating an audio signal with an audio capture field dependent on at least one directional parameter.

The generating at least one user interface indication dependent on the at least one characteristic may cause the apparatus to perform at least one of: generating an audible indication; and generating a visual indication.

The generating the audible indication may cause the apparatus to perform: generating at least one first audio signal defining a normal audio capture field; and generating at least one second audio signal defining an audio capture field dependent on the at least one characteristic.

The at least one first and the at least one second audio signals may be spatially located audio signals.

The generating the visual indication may cause the apparatus to perform at least one of: generating a visual representation of the normal audio capture field; generating a visual representation of the audio capture field dependent on the at least one characteristic; generating an augmented reality representation of the audio capture field dependent on the at least one characteristic; generating an indication of the estimated audio capture field; generating an indication representing a bend angle determined to produce an audio capture field to capture at least one audio source; generating an indication of the number of audio sources within an audio capture field defined by the at least one characteristic; and generating an indication of the total number of audio sources within a full audio capture field.

The determining at least one characteristic may cause the apparatus to perform at least one of: sensing the characteristic; and receiving at the apparatus the characteristic associated with a flexible part of the further apparatus.

An apparatus may comprise: the apparatus as described herein, and the further apparatus comprising at least one flexible part.

According to a fourth aspect there is provided an apparatus comprising: at least one determiner configured to determine at least one characteristic associated with a flexible part of a further apparatus; a signal processor configured to process at least one signal dependent on the at least one characteristic associated with the flexible part of the further apparatus, wherein the signal is at least one of an audio and a video signal; and an user interface generator configured to generate at least one user interface indication dependent on the characteristic associated with a flexible part of the further apparatus.

The at least one characteristic may comprise at least one of: a bend angle for the flexible part of the further apparatus; a bend radius for the flexible part of the further apparatus; a bend direction for the flexible part of the further apparatus; a position for the flexible part of the further apparatus relative to the apparatus; and a direction for the flexible part of the further apparatus relative to a the apparatus.

The at least one signal may comprise at least one of: at least one microphone audio signal; at least one audio signal received from a separate apparatus; at least one audio signal in the apparatus; at least one camera video signal; at least one video signal received from a separate apparatus; and at least one video signal in the apparatus.

The signal processor may comprise a capture field definer configured to define an audio capture field for the at least one audio signal dependent on the at least one characteristic.

The at least one characteristic may be a bend direction, and the capture field definer is configured to define: a normal audio capture field where the bend direction is flat; a narrowed audio capture field where the bend direction is inwards; and a broadened audio capture field where the bend direction is outwards.

The signal processor may comprise a signal compressor configured to compress the at least one audio signal dependent on the at least one bend parameter indicating an inwards bend direction.

The signal processor may be configured to generate an audio signal with an audio capture field dependent on the at least one characteristic.

The signal processor may be configured to generate an audio signal with an audio capture field dependent on at least one directional parameter.

The user interface generator may comprise: an audio generator configured to generate an audible indication; and a visual generator configured to generate a visual indication.

The audio generator may comprise: a normal capture field generator configured to generate at least one first audio signal defining a normal audio capture field; and a sensed capture field generator configured to generate at least one second audio signal defining an audio capture field dependent on the at least one characteristic.

The at least one first and the at least one second audio signals may be spatially located audio signals.

The visual generator may comprise: a normal capture field generator configured to generate a visual representation of the normal audio capture field; a sensed capture field generator configured to generate a visual representation of the audio capture field dependent on the at least one characteristic; an augmented reality field generator configured to generate an augmented reality representation of the audio capture field dependent on the at least one characteristic; an estimated field generator configured to generate an indication of the estimated audio capture field; a guide bend generator configured to generate an indication representing a bend angle determined to produce an audio capture field to capture at least one audio source; a source estimator configured to generate an indication of the number of audio sources within an audio capture field defined by the at least one characteristic; and a total source estimator configured to generate an indication of the total number of audio sources within a full audio capture field.

The at least one determiner may comprise at least one of: at least one sensor configured to sense the characteristic; and a receiver configured to receive the at the apparatus the characteristic associated with a flexible part of the further apparatus.

An apparatus may comprise: the apparatus as described herein, and the further apparatus comprising at least one flexible part.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which:

FIG. 3 shows the operation of the flexible spatial audio processing apparatus according to some embodiments;

FIG. 8 shows an example of a proposed apparatus configuration with three microphones and multiple flexible support parts according to some embodiments;

FIGS. 9 and 10 show an example user interface sound icon or display showing the spatial audio capture field for a normal, and bended, apparatus shape according to some embodiments;

FIGS. 17, 18 and 19 show an example flexible apparatus controller for a stationary microphone array according to some embodiments.

DESCRIPTION OF SOME EMBODIMENTS OF THE APPLICATION

Figure 1:
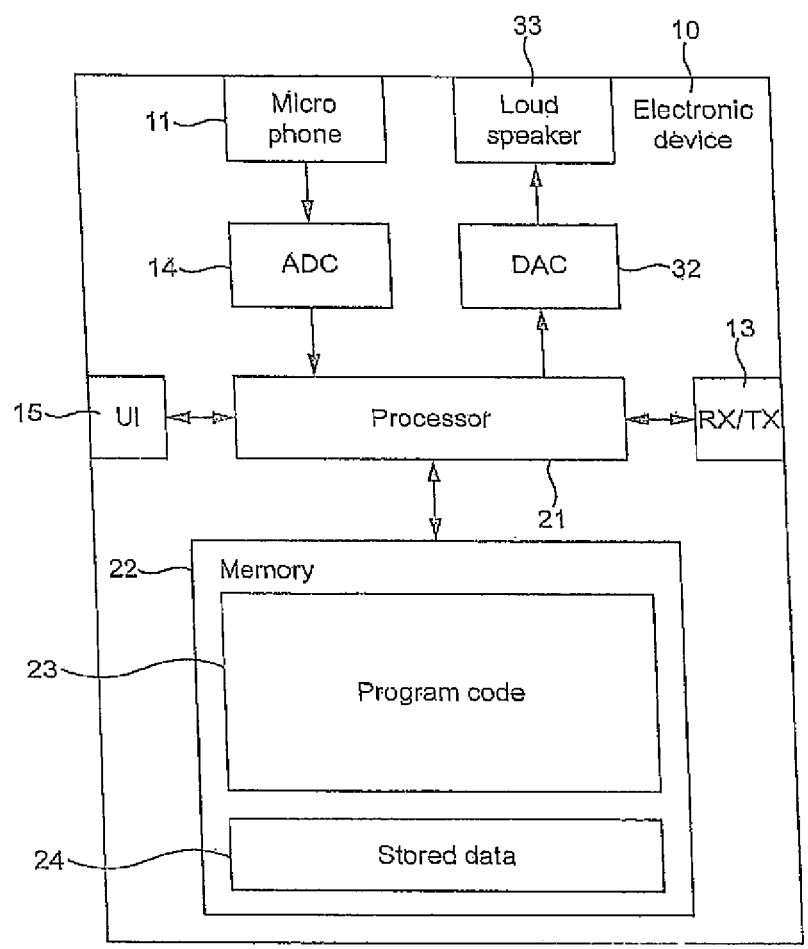
FIG. 1 shows schematically an electronic device employing some embodiments of the application.
Figure 2:
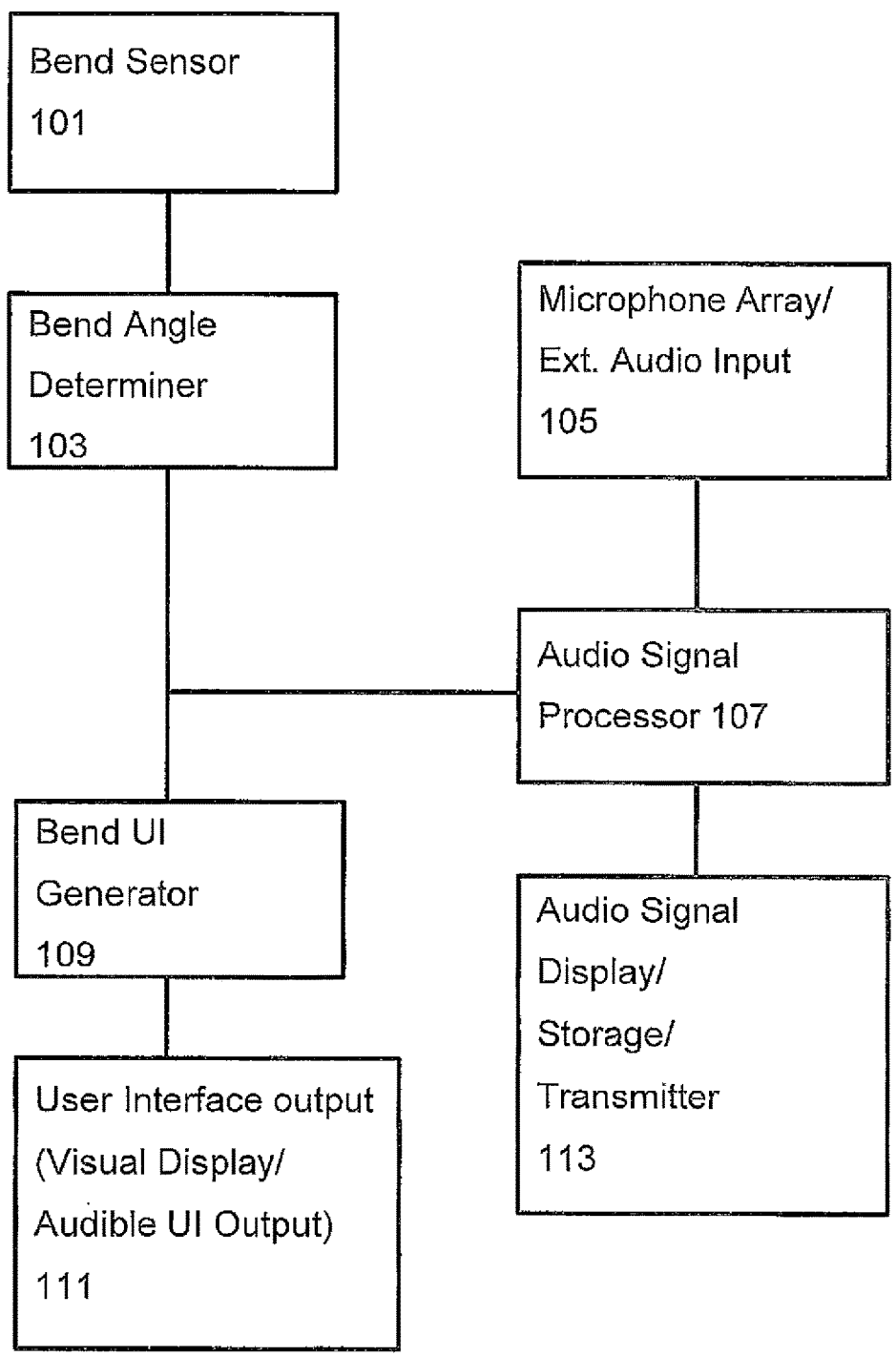
FIG. 2 shows schematically an example flexible apparatus microphone array processing and display apparatus according to some embodiments.

The following describes in more detail possible flexible spatial audio capture apparatus. In this regard reference is first made to FIG. 1 which shows a schematic block diagram of an exemplary electronic device or apparatus 10, which may incorporate flexible spatial audio capture apparatus according to some embodiments.

The apparatus 10 may for example, as described herein be a mobile terminal or user equipment of a wireless communication system. In other embodiments the apparatus 10 may be an audio-video device such as video camera, a Television (TV) receiver, audio recorder or audio player such as a mp3 recorder/player, a media recorder (also known as a mp4 recorder/player), or any computer suitable for the processing of audio signals.

The electronic device or apparatus 10 in some embodiments comprises a microphone 11, which is linked via an analogue-to-digital converter (ADC) 14 to a processor 21. The processor 21 is further linked via a digital-to-analogue (DAC) converter 32 to loudspeakers 33. The processor 21 is further linked to a transceiver (RX/TX) 13, to a user interface (UI) 15 and to a memory 22.

In some embodiments the apparatus 10 comprises a processor 21. Furthermore in some embodiments the apparatus 10 comprises a memory 22, and further a data storage section 24 and program code section 23. The processor 21 can in some embodiments be configured to execute various program codes. The implemented program codes in some embodiments comprise flexible spatial audio signal processing and visualisation generation code as described herein. The implemented program codes 23 can in some embodiments be stored for example in the memory 22 for retrieval by the processor 21 whenever needed. The memory 22 could further provide a section 24 for storing data, for example data that has been processed in accordance with the application.

The flexible spatial audio signal processing and visualisation generation code in some embodiments can be implemented in hardware or firmware.

In some embodiments the apparatus 10 comprises a user interface 15. The user interface 15 enables a user to input commands to the electronic device 10, for example via a keypad, and/or to obtain information from the electronic device 10, for example via a display. In some embodiments a touch screen may provide both input and output functions for the user interface. The apparatus 10 in some embodiments comprises a transceiver 13 suitable for enabling communication with other apparatus, for example via a wireless communication network.

A user of the apparatus 10 for example can use the microphone array 11 comprising at least one microphone for inputting speech or other audio signals that are to be transmitted to some other apparatus or that are to be stored in the data section 24 of the memory 22.

The analogue-to-digital converter (ADC) 14 in some embodiments converts the input analogue audio signal into a digital audio signal and provides the digital audio signal to the processor 21. In some embodiments the microphone array 11 microphones can comprise an integrated microphone and ADC function and provide digital audio signals directly to the processor for processing.

The processor 21 in such embodiments then processes the digital audio signal according to any suitable flexible spatial audio signal processing as described herein.

The resulting bit stream can in some embodiments be provided to the transceiver 13 for transmission to another apparatus. Alternatively, the processed audio signal in some embodiments can be stored in the data section 24 of the memory 22, for instance for a later transmission or for a later presentation by the same apparatus 10.

The apparatus 10 in some embodiments can also receive a bit stream with correspondingly spatial audio signals from another apparatus via the transceiver 13. In this example, the processor 21 may execute flexible spatial audio signal processing and visualisation generation program code stored in the memory 22. The processor 21 in such embodiments can perform flexible spatial audio signal processing and/or generate visualisation of the received data. Furthermore the processor 21 in some embodiments can be configured to apply audio signal processing as described herein, and provide the signal output to a digital-to-analogue converter 32. The digital-to-analogue converter 32 converts the signal into analogue audio data and can in some embodiments output the analogue audio via the loudspeakers 33. Execution of the audio processing program code in some embodiments can be triggered by an application called by the user via the user interface 15.

The received data in some embodiments can also be stored instead of an immediate presentation via the loudspeakers 33 in the data section 24 of the memory 22, for instance for later audio signal processing and presentation or processing and forwarding to still another apparatus.

It is to be understood again that the structure of the apparatus 10 could be supplemented and varied in many ways.

It would be appreciated that the schematic structures described in FIGS. 2, and 4 to 20 and the method steps shown in FIG. 3 represent only a part of the operation of audio signal processing apparatus and specifically flexible spatial audio signal processing apparatus or methods as exemplarily shown implemented in the apparatus shown in FIG. 1.

The concept as embodied in the implementations described herein is that of a flexible device comprising device bending angle sensors. With respect to FIG. 8 an example of the apparatus according to some embodiments is shown. The apparatus 701 comprises nine alternating rigid and flexible parts or sections enabling the apparatus to be bent into shape. The two end parts, part 1 711 and part 9 727 can in some embodiments be rigid parts, each part comprising a microphone. Thus in some embodiments part 1 711 comprises a first microphone 703 and part 9 727 comprises a second microphone 707. In some embodiments between the end sections are arranged alternating flexible and rigid sections to provide the apparatus with sufficient flexibility to be bent into any suitable shape but maintain sufficient rigidity to maintain that shape when set and not easily be deformed otherwise. Thus part 2, a flexible part, 713 is located between the rigid part 1 711 and a part 3 715, part 4 717, which is flexible, is located between the rigid parts part 3 717, and part 5 719. The part 5 719 can comprise in some embodiments a third microphone 705. Between part 5 719 and part 7 723, which are both rigid can be located part 6 721 which is flexible, and between part 7 723 and part 9 727 (the second and part) can be located part 8 725 which is flexible.

It would be understood that in some embodiments the flexible parts, the part 2 713, part 4 717, part 6 721 and part 8 725 can be configured with bend sensors to determine the angle, direction, and radius or the bend of the flexible part. In some embodiments the bend sensor element of the flexible parts can be, for example, a strain gauge based sensor configured to change electrical connectivity between rigid sections depending on the angle and direction of bend.

It would be understood that in some embodiments the apparatus can have more than or fewer than three microphones. For example as described herein the apparatus can be used as a controller for a separate microphone array and/or external microphones forming or adding to the array.

In some embodiments the bending or bend angle defined by the apparatus 701 defines the width of the captured audio field physically, by the angle of the apparatus where microphones are located within the apparatus and in some embodiments virtually by processing the generated audio signals from external microphones and internal microphones. Furthermore the physical deformation of the apparatus and therefore the angles of the microphones can be used as inputs for controlling signal processing and storing any spatial processed audio signal, for example removing any redundant information so that the audio signal can be compressed efficiently.

Thus in some embodiments the flexible apparatus can be used to define the width of the spatial audio field for any recording, and processing into an output for digital storage where the sound within the defined field is captured in a required or suitable quality and correspondingly sounds originating from outside the defined field are attenuated as much as possible.

The narrowed spatial width audio signal stored on the apparatus in such embodiments can be that the technical effect is that storage space is saved as due to signal processing/encoding determined by the bend of the apparatus only part of the spatial audio field is stored.

In some embodiments as described herein the concept as implemented is to determine an "inward" bend angle of the apparatus body, and then based on the bend angle to narrow the spatial audio captured field obtained from the microphone array and furthermore be configured to generate a visualisation of this narrowing thus giving the user a visual and/or audio indication of the current width of the field in comparison to the normal width. Furthermore in some embodiments the concept as implemented can determine an outward bending angle for widening the spatial audio capture field beyond the normal width and further be configured in some embodiments to generate a visualisation of this broadening. In some embodiments the apparatus can establish a connection to additional external microphones to assist in the broadening of the audio captured field width. Furthermore in some embodiments the apparatus can be configured to determine the direction of the flexible device in relation to an external fixed microphone array for directing or controlling the spatial audio capture field into the direction where the apparatus is pointing.

As shown in FIG. 8 described herein the hardware implementation of some embodiments can comprise a microphone array component, coupled to a digital recording, processing and computing device or apparatus. In some embodiments these functionalities can be integrated into a single apparatus. With respect to FIGS. 2 and 3 an apparatus comprising the digital recording and processing functionality is shown according to some embodiments.

In some embodiments the apparatus comprises at least one bend sensor 101. The bend sensor 101 can for example as described herein be a strain gauge configured to analyse electrical signals passed between rigid sections which change or are dependent on the angle and direction of the bend for the flexible section between the rigid sections. In some embodiments there can be more than one bend sensor monitoring each flexible section or part. In some embodiments a single bend sensor can monitor more than one flexible part or section In some embodiments where the microphone array is located external to the apparatus then in some embodiments the bend sensor 101 can further be configured to generate information concerning the location of the microphones within the rigid sections, for example whether the microphones are directional or omni-directional.

Figure 5:
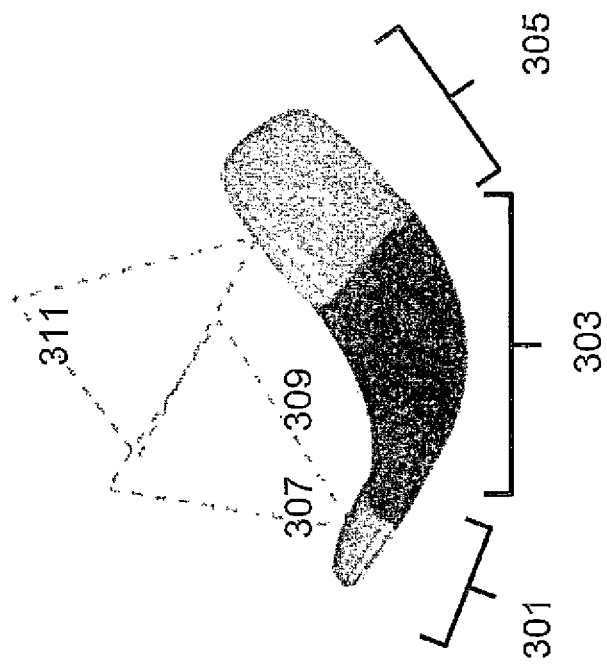
FIGS. 4 and 5 show an example of the position of three directional microphones and their audio capture field when the apparatus is in its normal, (flat) shape and the bended (physically deformed) shape according to some embodiments.
Figure 4:
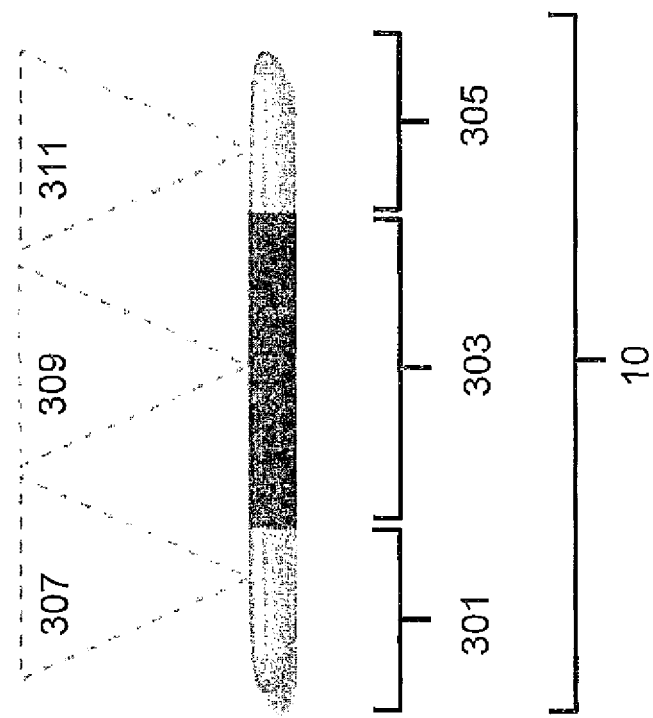

Example audio capture fields for a three microphone array for a directional microphone configuration is shown with respects to FIGS. 4 and 5. In FIG. 4 the apparatus 10 differs from the apparatus 701 shown in FIG. 8 in that the end portions or parts 301 and 305 are rigid and comprise each a microphone and there is only one flexible central portion or part 303 which also contains a microphone. The first part microphone audio capture field 307 is shown as a directional capture field with an apex at the apparatus microphone conically extending outwards. The second part 303, which is flexible and, comprises the second microphone has a second audio capture field 309 with a similar apex at the apparatus and conically extending outwards from the apparatus also. The third part 305 which is rigid comprises a third microphone with the third audio capture field 311 with an apex at the microphone extending conically outwards.

With respect to FIG. 5 the central or second part 303 has been bent or physically deformed such that the first microphone capture field 307, the second microphone capture field 309 and the third microphone capture field 311 now overlap significantly within the near field (compared against the lack of overlap in the near field as shown in FIG. 4). In other words the physical deformation of the apparatus changes the audio capture fields because of the realignment of the directional microphones.

Figure 7:
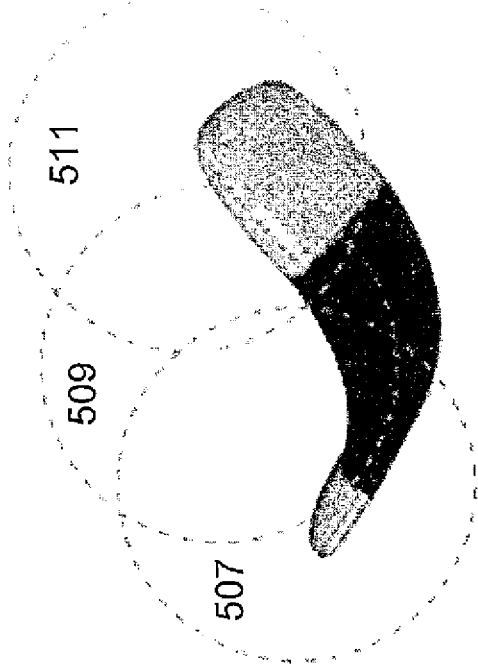
FIGS. 6 and 7 show an example of the position of three omni-directional microphones and their audio capture field when the apparatus is in its normal, and banded, shapes according to some embodiments.
Figure 6:
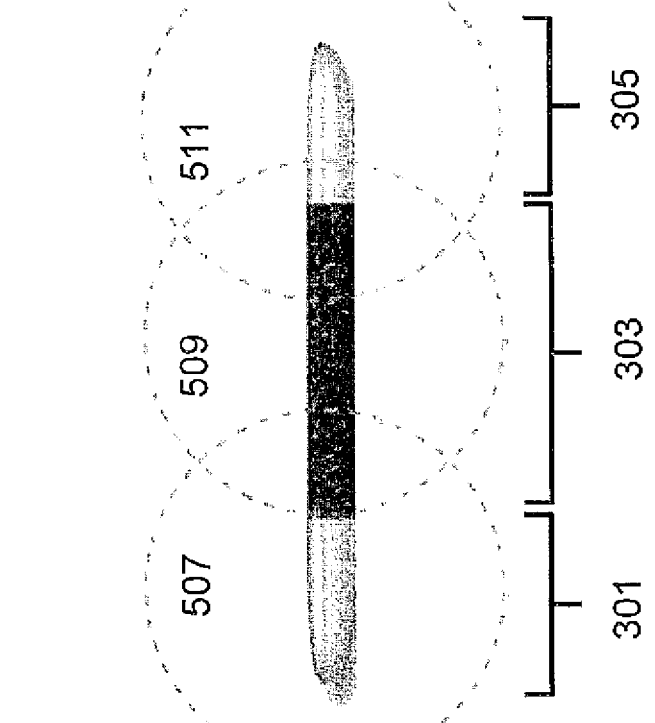

With respect to FIG. 6 the same apparatus is shown however the microphones in the first 301, second 303 and third 305 parts are omni-directional microphones and must have an omni-directional audio capture field. The first microphone audio capture field 507, the second microphone capture field 509 and the third microphone capture field 511 overlap in the near field where the apparatus is flat and as shown in FIG. 7 overlap further where the apparatus is bent or physically deformed. However, bending the apparatus does not cause as severe a realignment of the microphone capture field when compared to the directional microphone embodiments.

The operation of determining or receiving the position/bend sensor information is shown in FIG. 3 by step 203.

In some embodiments the apparatus comprises a bend angle determiner 103. The bend angle determiner 103 can be configured to receive the bend angle sensor information from the bend sensor 101 and determine the bend angle or bend parameters of the apparatus. The bend angle determiner 103 can in some embodiments determine such parameters as the bend direction, the bend radius or the bend angle between segments. In some embodiments the bend angle determiner 103 can be further configured to receive and pass the defined microphone configuration information such as the location of the microphones in the rigid sections, and the type of microphone in the rigid sections (such as directional or omni-directional).

The bend angle determiner can be configured to output this bend angle information and other information to the audio signal processor 107 and furthermore to a bend user interface generator 109.

The operation of determining the bend Parameters is shown in FIG. 3 by step 205.

In some embodiments the apparatus comprises a microphone array/external audio input 105. As discussed herein the microphone array can in some embodiments be implemented within the apparatus such as shown in FIGS. 4 to 8 however, in some embodiments the microphone array can be external to the apparatus and the audio input received via a wireless or wired coupling to the apparatus.

The operation of receiving the audio signals from the external audio or internal microphone array is shown in FIG. 3 by step 201.

In some embodiments the apparatus comprises an audio signal processor 107. The audio signal processor 107 can be configured to receive the audio signals from the microphone array/external audio inputs 105 and also the bend parameters from the bend angle determiner 103. The audio signal processor 107 can be configured to then process the audio signals from the microphone array/external audio input dependent on the bend angle characteristics. In some embodiments the audio signal processor 107 can be configured to compensate for any physical deformation of the audio capture fields due to the bending or deformation of the apparatus.

In some embodiments this audio signal processing 107 can be implemented to compress the audio signals generated from microphone array into a suitable multi-channel audio signal output. For example a binaural output for a binaural headset, or a suitable multi-channel loudspeaker output. In such embodiments the audio signal processor 107 can be configured to mix the microphone array audio signals according to the bend angle determiner bend parameters such that the audio capture field reflects the bend angle of the apparatus. In some embodiments the spatial processing of the audio signal can be implemented as a head related transfer function (HRTF) or similar impulse response function for each microphone audio signal input. In some embodiments the deformation of the apparatus can control the audio signal processor 107 to therefore mute the audio signal captured by some of the microphones as these signals are redundant and contain information determined from other microphones. In some embodiments the audio signal processor 107 can be configured to modify the overall gain and possibly modify certain frequencies ranges according to the bend characteristics.

The audio signal processor 107 can then output the audio processed signal to the audio signal display/storage/transmitter 113.

The operation of signal processing the audio signals depending on the array and bend parameters is shown in FIG. 3 by step 207.

In some embodiments the apparatus comprises a bend user interface generator 109. The bend user interface generator 109 can be configured to generate a user interface output dependent on the bend angle characteristics and in some embodiments the characteristics of the microphone array as determined by the audio signal processor 107.

As shown in FIGS. 9 and 10 an example user interface sound icon representation of the width of the spatial audio capture field is shown for a normal apparatus 810 configuration and a bent or physically deformed apparatus 811 configuration. In some embodiments the bend user interface generator 109 can be configured to generate a first reference or default user interface sound played at a first defined left and right positions. This first distance value is shown as the light shaded positions 801 in FIG. 9. The bend UI generator 109 can in some embodiments generate a second comparison user interface sound to indicate, in comparison to the width of the first or default user interface sound, the current width of the spatial audio capture field.

In some embodiments these four user interface sounds can be generated in rapid succession. The comparison user interface sound can in some embodiments have a separate timbre or pitch in order to help the user to distinguish it from the default or first sound. In some embodiments the default and comparison user interface sounds can be mixed with any captured or generated audio signal for monitoring purposes.

It would be understood that the width of the comparison user interface sound would define or indicate the width of the spatial audio capture field relative to the 'flat' or normal operating position. Thus as shown in FIG. 9 the comparison user interface sound 803 is the same width as the default or first user interface sound 801 and as shown in FIG. 10 where the spatial audio capture field is narrowed due to bending in a first direction then the comparison user interface sound 813 distance representing the spatial audio capture field is narrowed. It would be understood that in some embodiments where the spatial audio capture field is widened or broadened by bending the apparatus in the direction opposite to that shown in FIG. 10 or where the microphones are mounted on the other side of the apparatus then the comparison user interface sound can be broader or wider than the default or first user interface sound to indicate that the width of the spatial audio capture field is broader than the normal or flat operating position of the apparatus.

Figure 12:
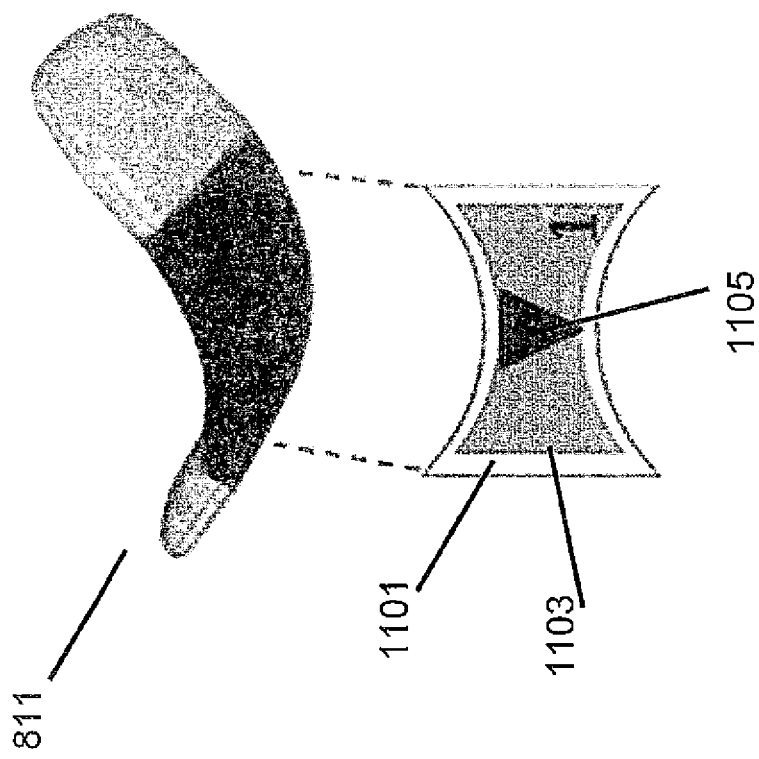
FIGS. 11 and 12 show an example visual user interlace display of the width of the spatial audio capture field for a normal, and bended, apparatus shape according to some embodiments.
Figure 11:
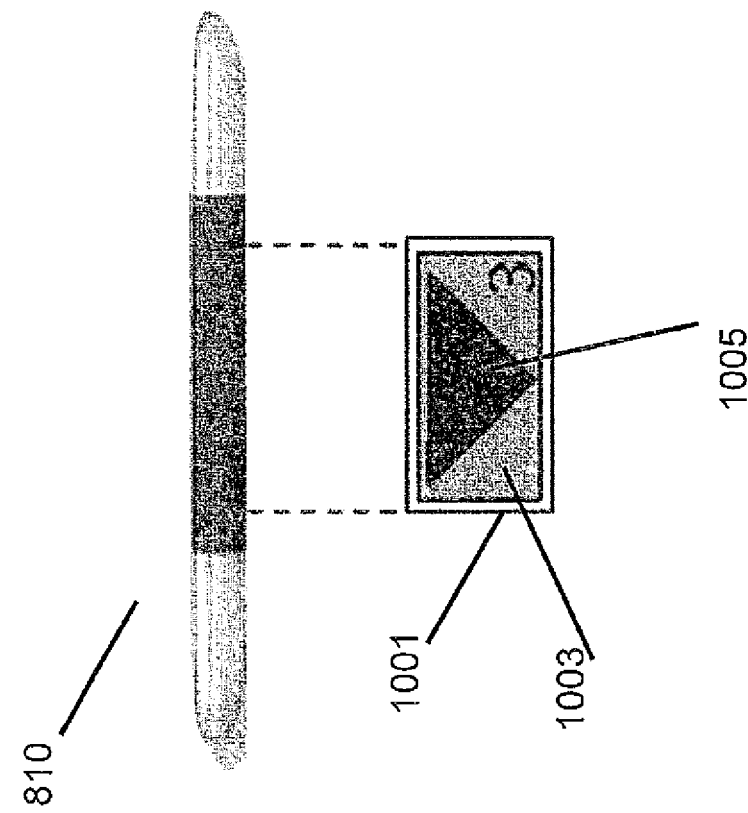

In some embodiments the bend user interface generator 109 can be configured to indicate or generate a visual representation of the width of the spatial audio capture field. In such embodiments the display on the device can be a flexible component. In such embodiments the bend user interface generator 109 can be configured to determine a visual representation of the spatial audio capture field in relation to the normal width of the field. For example as shown in FIGS. 11 and 12 a visual representation of first flat or normal position for the apparatus is shown where the display 1001 can be configured to display the 'maximum' possible width of the field 103 and the current width of the spatial audio capture field by the triangle 1005. Where the apparatus is bent 811, as shown in FIG. 12, the display 1101 shows the maximum possible width of the spatial audio capture field 1103 and the narrower current spatial audio capture field represented by a triangle 1105 with a narrower angle than the triangle in FIG. 11.

In some embodiments the bend user interface generator 109 can overlie or mix the visual image generated by the bend UI generator with an actual image captured by the apparatus. Furthermore in some embodiments the bend UI generator 109 can be configured to illustrate sound sources on the display of the apparatus. Thus in some embodiments the sound sources inside the maximum width of the spatial audio capture field but not within the currently selected capture field could be animated inside the display region 1003/1103 to indicate the width required for the capture field in order to record the sound sources. In some embodiments the bend UI generator 109 can be configured to provide a visual indicator of how many channels the audio field is monitoring recording with the current bending angle. Furthermore the bend UI generator 109 can be configured in some embodiments to present the data rate of the audio signal processor audio signal output.

Figure 14:
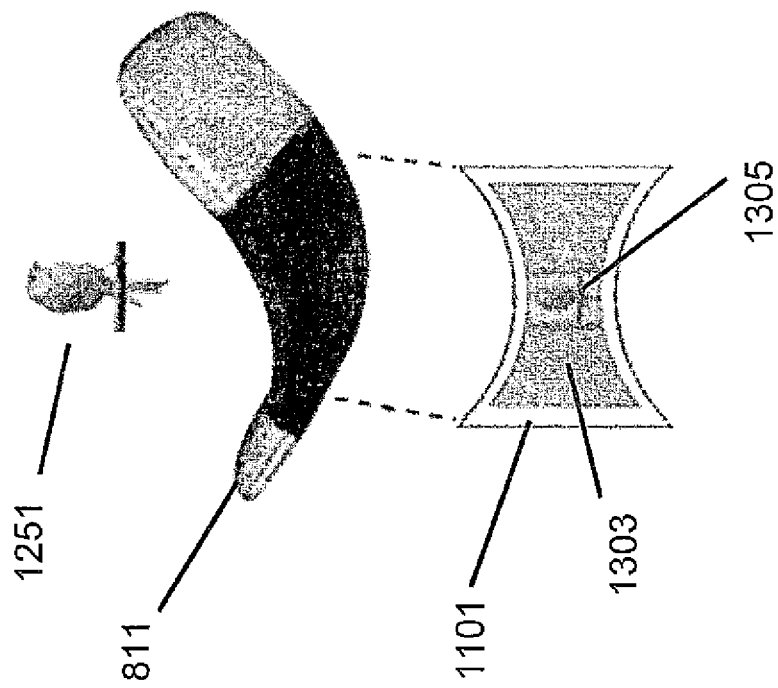
FIGS. 13 and 14 show an example augmented reality spatial audio capture field visualisation for the normal, and bended, apparatus shapes according to some embodiments.
Figure 13:
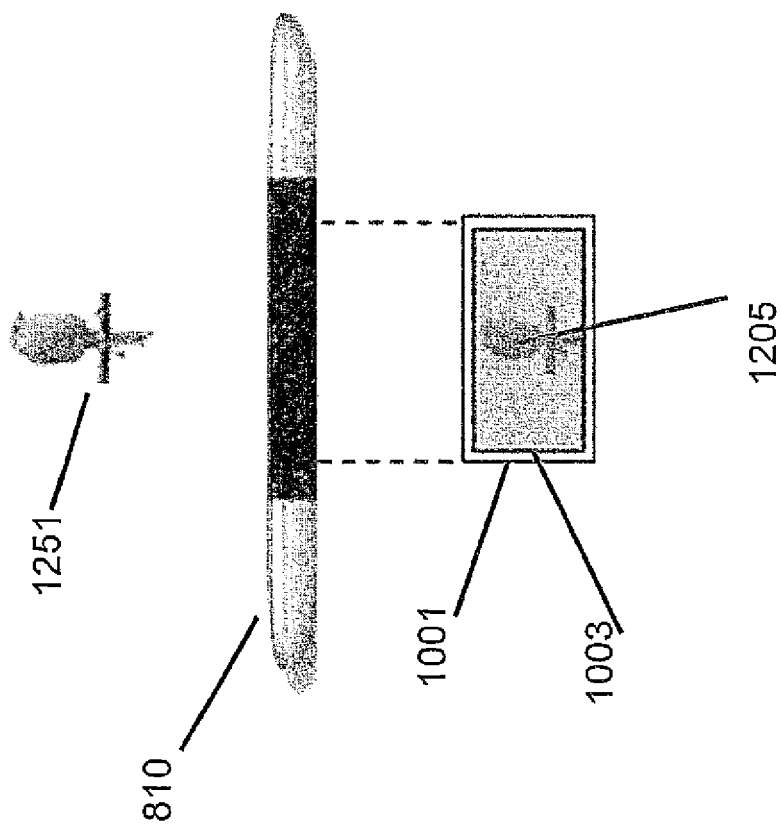

With respect to FIGS. 13 and 14 another example of the output of the bend UI generator 109 can be shown wherein the bend UI generator 109 is configured to show the width of the spatial audio capture field as an overlay of an augmented reality view on the display of the apparatus.

In the example shown in the FIGS. 13 and 14 the sound source 1251 is located approximately in the middle of the display. The flat or normal device configuration 810 can be represented by the bend UI generator on the display 1001 as the image of the sound source 1205 and the normal or flat apparatus spatial audio capture field width 1003. Whereas when the apparatus is in a bent or deformed configuration 811 the display 1101 shows the bent apparatus spatial audio capture field width 1305 and the audio signal source over a background of the maximum spatial audio capture field. In some embodiments the bend UI generator 109 can generate a visualisation of the bend as an augmented reality view by performing a visual zoom of the captured image into the sound source direction onto the display.

In some embodiments the bend UI generator 109 can configured to determine on the generated visualisation analysis of the sound sources in the area by the audio signal processor 107. As described herein the number or position of sound sources can be determined by the audio processor and based on this information the bend UI generator 109 can be configured to generate a user interface visual representation indicating to the user the bend angle for the apparatus which would be suitable for capturing the particular sound source identified by the audio signal processor as being the dominant sound source. The assisting or guiding the bend decision indication can be visual or audio.

Figure 16:
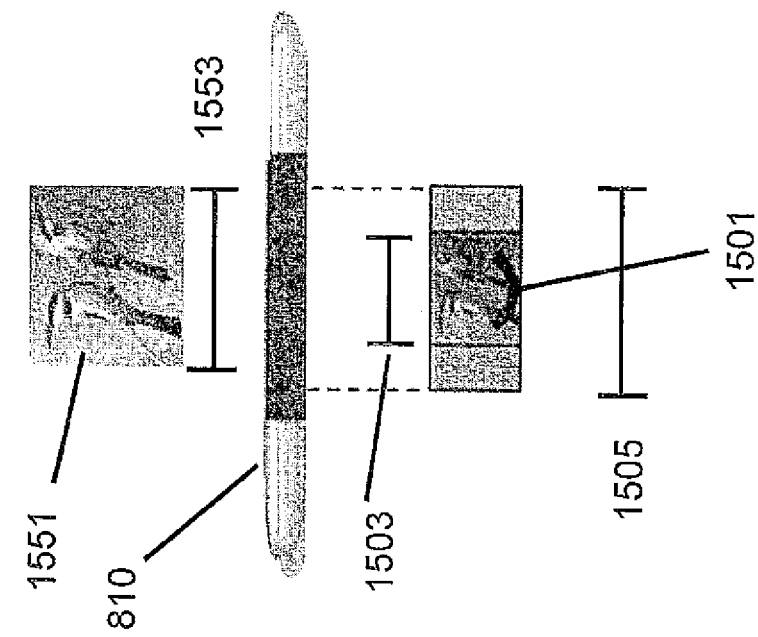
FIGS. 15 and 16 show an example aid for spatial audio capture field visualisation according to some embodiments.
Figure 15:
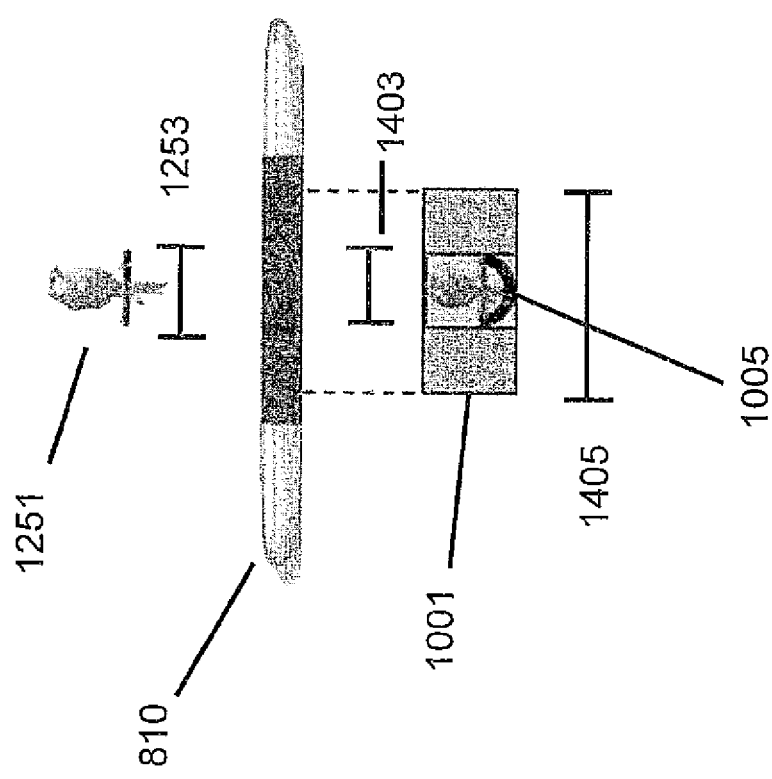

In FIGS. 15 and 16 examples of such guide bend visual representations are shown wherein with respect to FIG. 15 a sound source 1251 with a narrow width 1253 is displayed on the display 1001 as a foreground image 1403 and a suitable or recommended bend indicator 1401 is generated over the generated background spatial capture field width 1405. FIG. 16 shows an audio source 1551 with a wider width 1553 which causes the bend UI generator to generate a UI visualisation represented by a visual indicator 1503 (wider than the narrower source 1251) and have a recommended or suitable bend indicator 1501 which has a less sharp bend radius 1501.

The bend UI generator 109 can be configured to output the bend UI indicator to the user interface output 111.

Furthermore the operation of generating a user interface bend representation is shown in FIG. 3 by step 209.

In some embodiments the apparatus comprises the user interface output which can be the visual display, or audible output. The user interface output is configured to output the bend UI generator derived indicator in a suitable manner as described herein.

Furthermore in some embodiments the apparatus comprises an audio signal display/storage/transmitter 113 configured to either display the processed audio signal, store the processed audio signal or transmit the processed audio signal to a further device.

The operation of outputting such as display, storing or transmitting the audio signals and user interface bend representation is shown in FIG. 3 by step 211.

In some embodiments the apparatus can be configured to receive the audio signals from an external microphone array. For example as shown in FIGS. 17, 18 and 19 an external microphone array 1621 is worn by the user having a stationary microphone array located within a headband. The flexible apparatus and the bend angle of the apparatus can then be used to define the direction and the width of the spatial audio capture field in relation to the location of the microphone array, the user and the apparatus.

Thus as shown in FIG. 17 the apparatus 1601 is in a flat configuration held in front of the user defining a first spatial audio capture field width in front of the user and therefore configured to capture a first audio source 1651. The width and direction of the spatial audio capture field 1631 is thus dependent on the location and bend parameters of the apparatus 1601.

With respect to FIG. 18 the apparatus is configured in a concave "inwards" configuration to one side of the users' head. The concave directional configuration 1701 of the apparatus thus can be used by the audio signal processor to select and mix audio signals from the stationary microphone array 1621 to generate a spatial audio capture field which is narrower than the normal audio capture field as shown in FIG. 17 and directionally orientated to one side of the users' head pointing to a second sound source 1653.

With respect to FIG. 19 a third example is shown where the apparatus is in a convex "outwards" configuration in front of the user. The convex centrally located apparatus 1801 defines a spatial audio capture field 1831 which is wider or broader than the normal operation and thus can capture a wider range of sources such as shown in FIG. 19 by the capture of the audio signals for audio source 1651, 1653 and the third audio source 1655.

Figure 20:
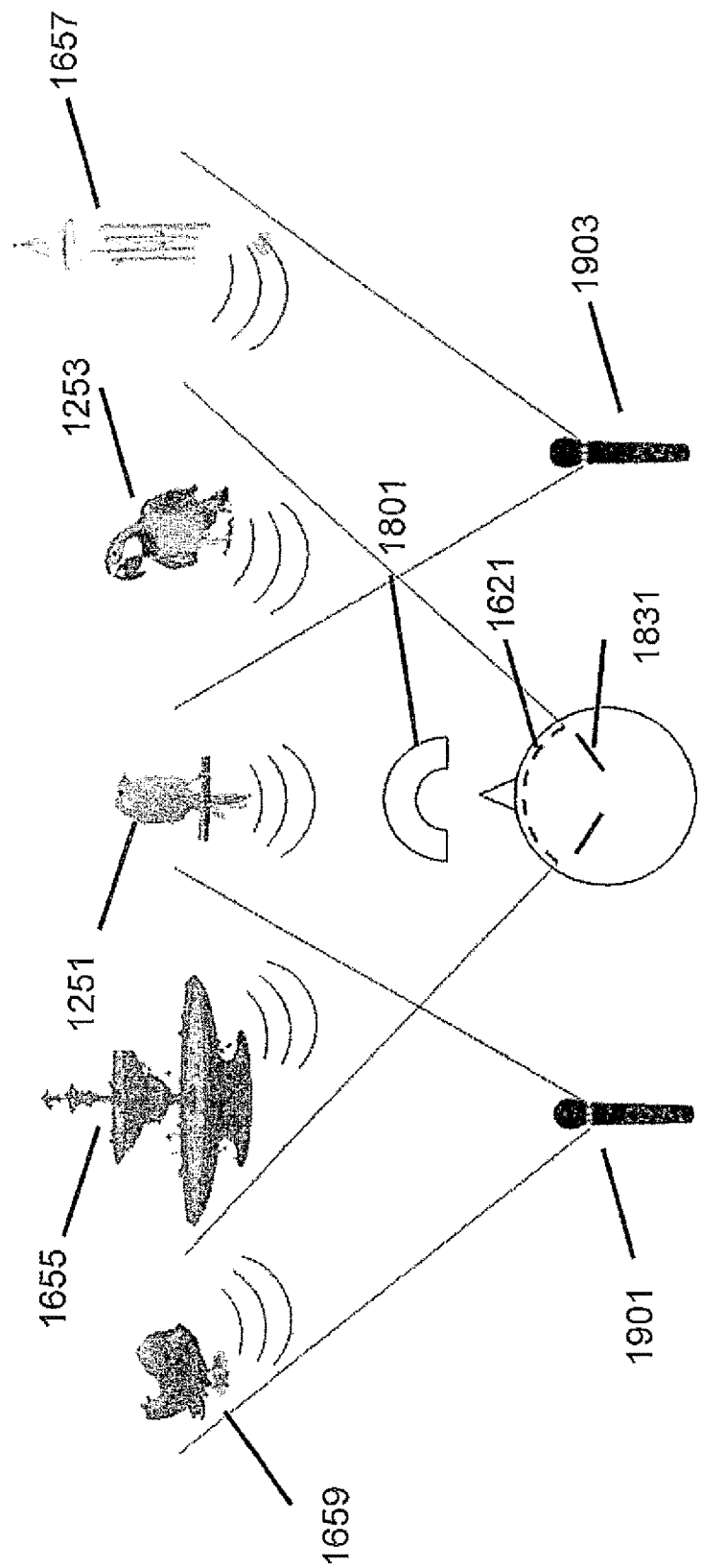
FIG. 20 shows an example flexible device as controller for a stationary microphone array and external microphone configuration according to some embodiments.

In some embodiments the bend parameters can be configured to select additional external sources to be mixed by the audio signal processor. Thus as shown in FIG. 20 a sufficiently convex "outwards" bending of the apparatus 1801 can be configured to generate an audio field width which comprises the extended spatial audio field 1831 from the headband microphone array 1621 but also of any known audio capture apparatus external to the headset such as shown in FIG. 20 by the external sources 1901 and 1903. The apparatus can be configured to connect wirelessly to the external microphone and store and optionally down mix the signals provided by them.

In some embodiments the narrowed in spatial audio width audio signal can be stored on the recording device such to provide a digital storage space saving for the part of the spatial audio field stored by the user. In some embodiments the narrowing of the audio capture field can be such that a single channel microphone signal can be used. In some embodiments where a single channel can store the audio signal additional directional information describing the sound can be stored as metadata so that the single channel recording can either be reproduced through a multi-channel playback system. In some embodiments, for example where the apparatus comprises five microphones, the bending angle of the apparatus controls down mixing of the audio signal. Thus for example where the bending angle is 0, 5 channels of audio is stored whereas as the device is bended further than 5 audio signal channels is down mixed into fewer channels.

It shall be appreciated that the term user equipment is intended to cover any suitable type of wireless user equipment, such as mobile telephones, portable data processing devices or portable web browsers.

Furthermore elements of a public land mobile network (PLMN) may also comprise audio codecs as described above.

In general, the various embodiments of the application may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the application may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus at least some embodiments may be an apparatus comprising at least one processor and at least one memory including computer program code the at least one memory and the computer program code configured to, with the at least one processor, cause the apparatus at least to perform: determining at least one characteristic associated with a flexible part of an apparatus; processing at least one signal dependent on the at least one characteristic associated with the flexible part of the apparatus, wherein the signal is at least one of an audio and a video signal; and generating at least one user interface indication dependent on the characteristic associated with a flexible part of an apparatus.

The embodiments of this application may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

Thus at least some embodiments may be a computer-readable medium encoded with instructions that, when executed by a computer perform: determining at least one characteristic associated with a flexible part of an apparatus; processing at least one signal dependent on the at least one characteristic associated with the flexible part of the apparatus, wherein the signal is at least one of an audio and a video signal; and generating at least one user interface indication dependent on the characteristic associated with a flexible part of an apparatus.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the application may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
   (a) hardware-only circuit implementations (such as implementations in only analog and/or digital circuitry) and
   (b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
   (c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least one processor, and
   at least one non-transitory memory including computer code for one or more programs, the at least one memory and the computer code configured to, with the at least one processor, cause the apparatus to perform operations comprising:
  receiving at least one audio signal generated from one or more microphones associated with a further apparatus;
  determining at least one bend characteristic corresponding to a flexible part of the further apparatus; and
  processing the at least one audio signal based on the at least one bend characteristic to define a width of an audio capture field of the one or more microphones.

2. The apparatus as in claim 1, wherein the at least one bend characteristic is indicative of at least one of:
  a bend direction of the flexible part of the further apparatus; or
  a value indicative of an amount the flexible part is bent relative to a flat position of the flexible part of the further apparatus.

3. The apparatus as in claim 1, wherein the operations further comprise:
  adjusting the width of the audio capture field in response to detecting a change in the at least one bend characteristic.

4. The apparatus as in claim 3, wherein adjusting the width of the audio capture field of the one or more microphones comprises either broadening the audio capture field based on the at least one bend characteristic, or narrowing the audio capture field based on the at least one bend characteristic.

5. The apparatus as in claim 1, wherein at least one of the microphones is one of:
  physically separate from the further apparatus, or
  located within the further apparatus.

6. The apparatus as in claim 1, wherein the operations further comprise:
  generating at least one user interface indication indicative of the width of the audio capture field of the one or more microphones.

7. A method comprising:
  receiving at least one audio signal generated from one or more microphones associated with an apparatus;
  determining at least one bend characteristic corresponding to a flexible part of the apparatus; and
  processing the at least one audio signal based on the at least one bend characteristic to define a width of an audio capture field of the one or more microphones.

8. The method as in claim 7, wherein the at least one bend characteristic is indicative of at least one of:
  a bend direction of the flexible part of the apparatus; or
  a value indicative of an amount the flexible part is bent relative to a flat position of the flexible part of the apparatus.

9. The method as in claim 7, further comprising:
  adjusting the width of the audio capture field in response to detecting a change in the at least one bend characteristic.

10. The method as in claim 9, wherein adjusting the width of the audio capture field of the one or more microphones comprises either broadening the audio capture field based on the at least one bend characteristic, or narrowing the audio capture field based on the at least one bend characteristic.

11. The method as in claim 7, wherein at least one of the microphones is physically separate from the apparatus.

12. The method as in claim 7, wherein at least one of the microphones is located within the apparatus.

13. The method as in claim 7, further comprising:
  generating at least one user interface indication indicative of the width of the audio capture field of the one or more microphones.

14. A non-transitory computer-readable medium encoded with instructions that, when computer-executed, cause the computer to perform operations comprising:
  receiving at least one audio signal generated from one or more microphones associated with an apparatus;
  determining at least one bend characteristic corresponding to a flexible part of the apparatus; and
  processing the at least one audio signal based on the at least one bend characteristic to define a width of an audio capture field of the one or more microphones.

15. The computer-readable medium as in claim 14, wherein the at least one bend characteristic is indicative of at least one of:
  a bend direction of the flexible part of the apparatus; or
  a value indicative of an amount the flexible part is bent relative to a flat position of the flexible part of the apparatus.

16. The computer-readable medium as in claim 14, wherein the operations further comprise:
  adjusting the width of the audio capture field in response to detecting a change in the at least one bend characteristic.

17. The computer-readable medium as in claim 16, wherein adjusting the width of the audio capture field of the one or more microphones comprises either broadening the audio capture field based on the at least one bend characteristic, or narrowing the audio capture field based on the at least one bend characteristic.

18. The computer-readable medium as in claim 14, wherein at least one of the microphones is physically separate from the apparatus.

19. The computer-readable medium as in claim 14, wherein at least one of the microphones is located within the apparatus.

20. The apparatus as in claim 1, where the further apparatus comprises at least one of:
  a device used with a microphone array located within a user headset,
  a user headset,
  a handheld device,
  a device remote from a user,
  a controller for a microphone array,
  a mobile terminal, or
  a microphone array.

* * * * *